United States Patent [19]

Munier et al.

[11] Patent Number: 4,972,345
[45] Date of Patent: Nov. 20, 1990

[54] APPARATUS FOR ERROR DETECTION AND REPORTING ON A SYNCHRONOUS BUS

[75] Inventors: Jean-Marie Munier, Cagnes Sur Mer; Michael Peyronnenc, Saint Jeannet; Michel Poret, Villeneuve Loubet, all of France

[73] Assignee: International Business Machines Corp., Armonk, N.Y.

[21] Appl. No.: 294,456

[22] Filed: Jan. 9, 1989

[30] Foreign Application Priority Data

Jan. 22, 1988 [EP] European Pat. Off. ........... 88480002

[51] Int. Cl.[5] ............................................ G06F 11/10
[52] U.S. Cl. .................... 371/295; 371/49.1; 371/61

[58] Field of Search ............... 371/29.5, 20.2, 49.1, 371/57.1, 61, 62

Primary Examiner—Jerry Smith
Assistant Examiner—Stephen M. Baker
Attorney, Agent, or Firm—Edward H. Duffield; Jerry W. Herndon

[57] ABSTRACT

An error detection apparatus is implemented in a passive device inserted on a synchronous bus, linking two devices. The bus has data lines onto which data are transferred between the two devices under control of tag lines and clock signals which are companion of the transferred data. The apparatus allows errors to be detected, the failing device to be identified and the error signals to be reported in a psuedo-synchronous way on an error bus due to error detection and reporting logic circuits and a pseudo-synchronous timing circuit.

7 Claims, 9 Drawing Sheets

PRIOR ART

WRITE TRANSFER (ADAPTER TO DMA)

READ TRANSFER (DMA TO ADAPTER)

P=PARM
D=DATA
ERR=ERROR
0=0000
EP=ERROR PATTERN
X=XXXX

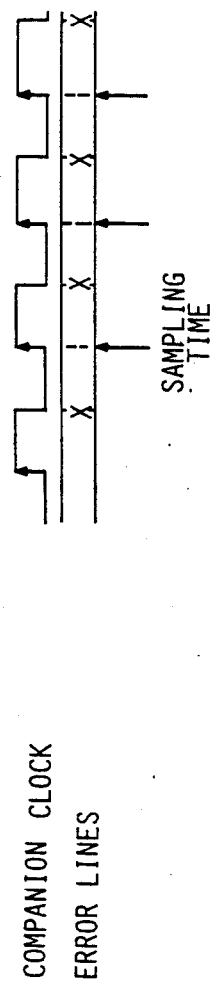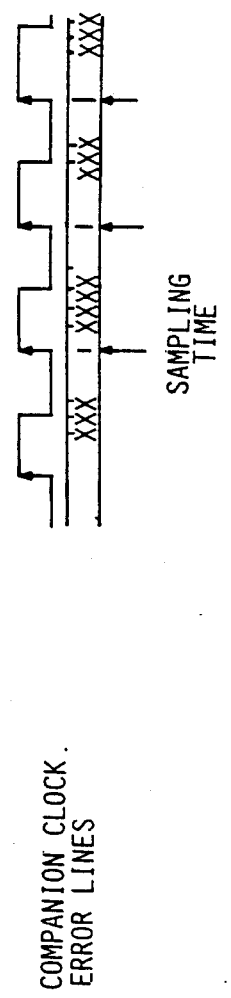

INBOUND TRANSFER
ADAPTER TO DMA LOGIC

APPARATUS FOR ERROR DETECTION AND REPORTING ON A SYNCHRONOUS BUS

DESCRIPTION OF THE INVENTION

1. Field of the Invention

This invention relates to an apparatus which may be implemented in a passive device inserted on a synchronous bus to detect and report errors in a pseudo-synchronous way.

2. Background of the Invention

Synchronous busses are based on the transmission of data together with a companion clock signal the goal of which is to validate data sent on parallel lines. Some tags are used between the sending and receiving devices to mutually signal protocol phases.

Such a synchronous bus is described in European Patent Application No. 87480007.1 filed on Aug. 20, 1987. This bus may be used in any data handling system and more particularly in a communication controller for controlling the exchange of information between a direct memory access DMA control device 2 and a line adapter device 4.

As shown in FIG. 1 of the aforementioned application, the bus comprises bidirectional data lines 6 which are used to carry the information between the two devices and exchange control lines. The exchange control lines comprise at least the following lines: a request line 8 which is activated by one adapter device when it requests a direct memory access, a grant line 10 which is activated by the DMA control device as an answer to a request signal o line, and a valid line 12 which is activated by the adapter device; the signal on this line is the envelope of the data transfer from the adapter to the DMA control device. It is checked by the DMA control device. The control lines also include: a ready line 14 which is activated by the DMA control device, the ready signal on this line is the envelope of the data transfer from the DMA device to the adapter, it is checked by the adapter device. A read/write control line 16 activated by the adapter; the signal on this line indicates whether a read or write operation is requested. A turn around line 18 is activated by the DMA control device when it has decoded a read operation to allow a possible driver/receiver gating on the bidirectional data bus.

The data are exchanged between the two devices on a parallel bus. The DMA control device transmits data synchronously with a companion clock signal it generates called DMCLK and transmitted on line 20. The adapter device tran data synchronously with a companion clock signal it generates called ADCLK and transmitted on line 22. These two clock signals are at the same frequency but there is no fixed phase relationship between them.

The protocol can be generalized to a multi-point link between the DMA control device and several adapter devices. This is made possible since the logical exchange remains point to point during the transfer between the DMA control device and any adapter device, with only one adapter being serviced at a time by the DMA control device.

A set of specialized lines 24 is provided to transmit synchronous error patterns from the DMA control device to the adapter device. These patterns are sent in synchronism with the DMCLK clock signal and are thus considered as synchronous information companion to data lines.

These patterns are generated by the DMA control device when it detect errors (internal errors or errors detected on the bus) and sent toward the adapter device.

In such an environment, it may be desirable to insert on the synchronous bus an asynchronous passive device able to redrive signals on the bus and to detect parity errors.

According to the present invention, this passive device is provided with error detection capabilities, in such a way that asynchronous error patterns have to be sent from the passive device to the adapter.

OBJECT OF THE INVENTION Consequently an object of the present invention is to provide an improved asynchronous device with a simple apparatus able to report errors in a pseudo-synchronous way on a synchronous bus.

SUMMARY OF THE INVENTION The apparatus according to the present invention is to be used in a passive device (30) inserted on a synchronous bus (1) linking first and second devices (2 and 4), said bus comprising data lines (6) onto which data are transferred from the first to the second device. The transfer of the data is timed by a first clock signal carried by a first clock line (20) of the bus. The apparatus detects and reports errors in pseudo-synchronous way to the second device on at least one pseudo-synchronous error line (50) of the bus.

It is characterized in that it comprises:

error detecting means (40,42) which are responsive to the data transiting in the passive device to detect whether the data carried on the data lines are correct or not and to generate at least one error signal in case of detected errors, timing means (52) which are responsive to the first clock signal to generate a sampling signal (70) comprising pulses active in the middle of the first clock signal cycle and an error report control signal (72) comprising pulses which are active for a fraction of the first clock signal period at the end of each first clock signal cycle, and error reporting means (48) which are responsive to the sampling signal and to the errror report control signal to activate the pseudo-synchronous error line(s) to cause a pulse of the sampling signal to sample the error signal(s) and activate the error line(s) during the time period defined by the two pulses of the error report control signal following said sampling pulse if the sampled error signal(s) is/are indicative of detected errors.

In case the data lines are bidirectional, which means that data are transferred from the first to the second device under control of the first clock signal or from the second to the first device under control of a second clock signal, said first and second clock signals having the same frequency, and the direction of transfers on the data lines being controlled by a transfer control signal generated by the first device on a transfer control line (18), the timing means are responsive to the transfer control signal and to the first and second clock signals to activate the pulses of the sampling signal in the middle of the first or of the second clock signal, depending upon the direction of transfer.

BRIEF DESCRIPTION OF THE DRAWING

FIG. 4-A and FIG. 4-B show the timing diagrams of synchronous and asynchronous error transmission on the error lines of the interface bus.

DETAILED DESCRIPTION OF THE INVENTION

Figure 1:
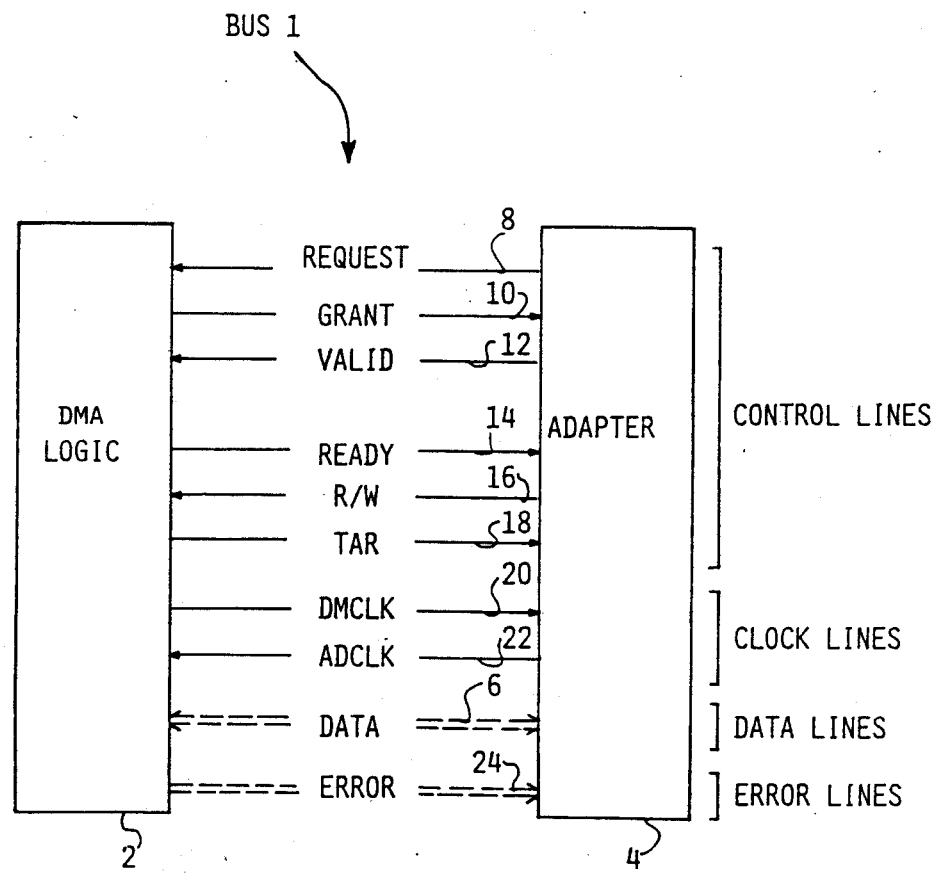
FIG. 1 shows a prior art synchronous interface bus between two devices.

As already explained, FIG. 1 shows a prior art synchronous interface between two devices 2 and 4. These may be a direct memory access DMA control device 2 and a line adapter 4 in a communication controller for exchanging data according to the protocol described before. The timing diagram of the write transfer operation from adapter 4 to DMA logic device 2 is shown in FIG. 2-A and the timing diagram of the read transfer operation from DMA device 2 to adapter 4 is shown in FIG. 2-B.

As shown in these timing diagrams, the data exchange on the data lines 6 is preceded by a parameter exchange phase. During this phase, the adapter sends parameter information to the DMA logic device 2. The parameter information may include the starting memory address where the first byte to be transferred is to be written or read and a byte count which indicates the number of bytes to be transferred. These parameters originate from the adapter and are sent under control of the adapter clock ADCLK on line 22 even if a read data transfer is to be performed. In case of a read data transfer, the subsequent data are sent from the DMA logic device to the adapter under control of the DMA clock DMCLK on line 20. The change of the direction of the transfers is controlled by the Turn Around signal on line 18.

Figure 2A:
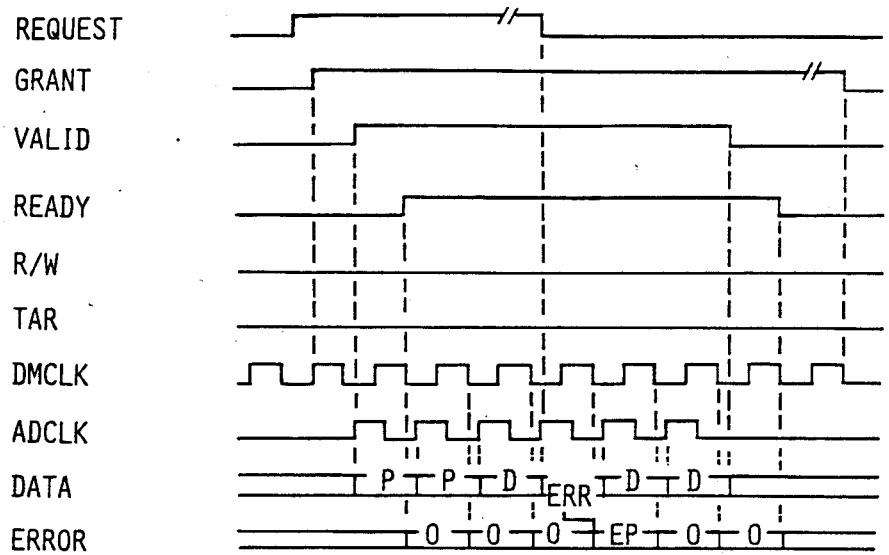
FIG. 2-A and 2-B show the timing diagrams of the transfers between these two prior art devices.
Figure 2B:
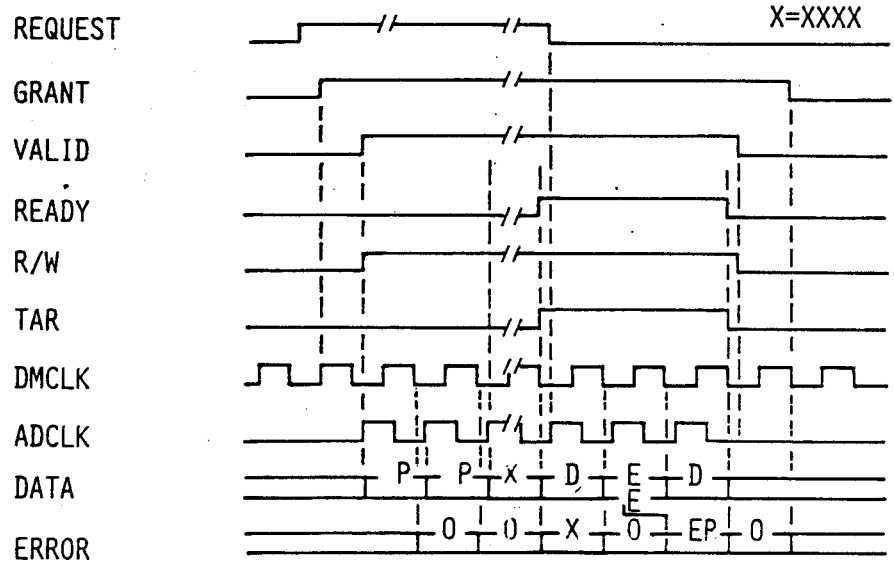

As shown in FIGS. 2-A and 2-B, when an error is detected by the DMA logic device 2, the error code is transmitted on the error lines 24 by the DMA logic device 2 on its next DMCLK cycle.

On such a synchronous bus allowing a synchronous exchange of data between two devices, it may be necessary to insert a passive device between the DMA logic device 2 and the adapter 4. One need for this new device may be a need for a more powerful electrical driving capability which cannot be provided by the DMA logic device.

This inserted device is considered as a passive device since, from an information transfer point of view, it is fully transparent. Its main function is to redrive signals and it has no synchronization capability on the bus.

The circuit according to the present invention which is to be used in this passive device is provided with error detection capabilities to help isolation among the parts which are involved in the data exchange, in case of bus failures.

Figure 3:
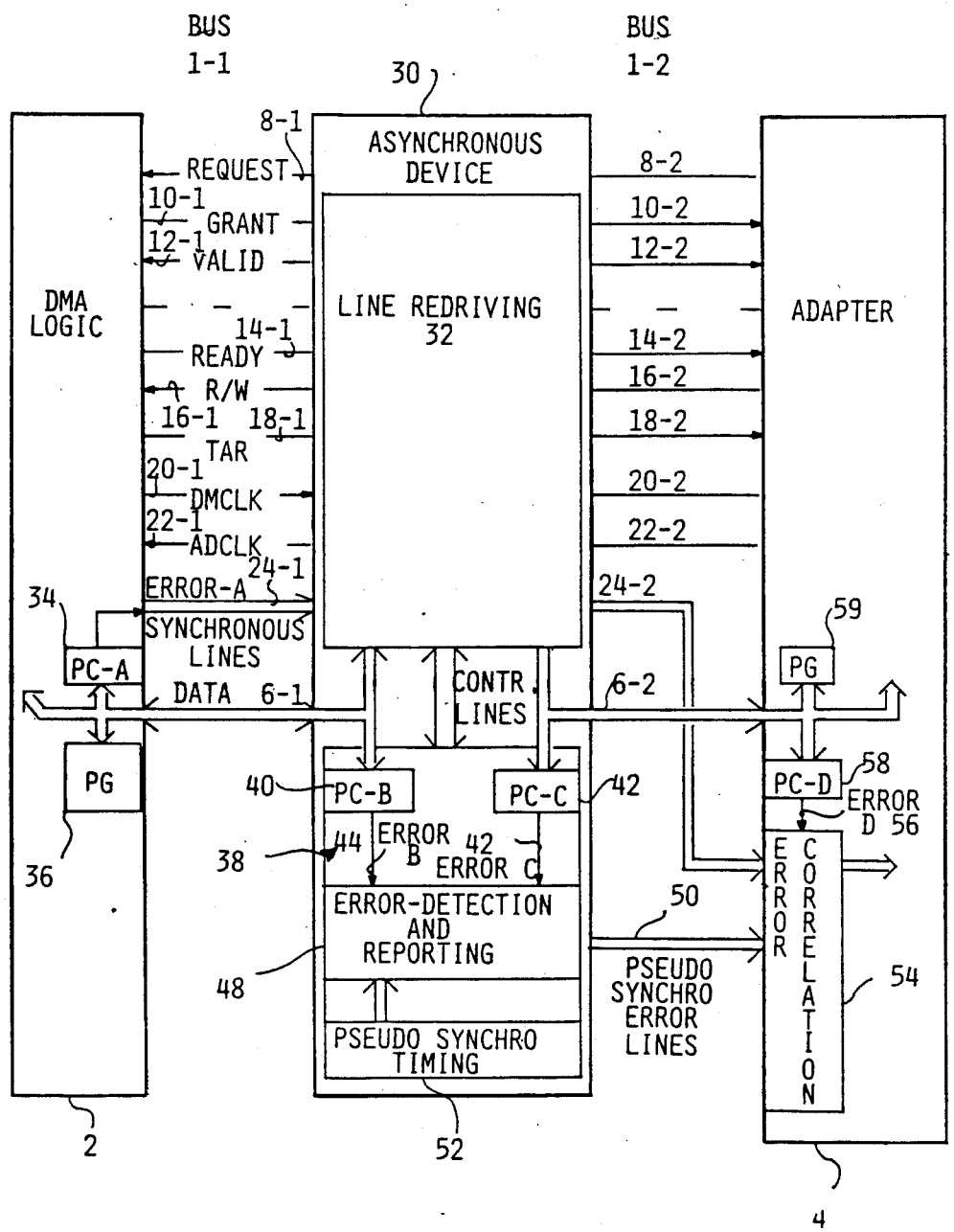
FIG. 3 shows the insertion of an asynchronous device on the synchronous bus, and the implementation of the error detection and reporting apparatus according to the present invention.

In FIG. 3, the asynchronous passive device 30 is schematically represented as comprising line redriving means 32; redriving means 32 is connected on one side to bus 1-1 and on the other side to bus 1-2. Buses 1.1 and 1-2 carry the request, grant, valid, ready, R/W, TAR, DMCLK, ADCLK, the data and synchronous error bits as described before.

There may be one error line 24 or a plurality of error lines used to report various kinds of errors occurring in device 2.

As an example one line among lines 24 is shown, it may be devoted to the reporting of an error detected by circuit 34, which may be a parity check circuit PC-A. Circuit 36 generates the parity bit to be sent on bus 6.

According to the present invention, circuit 30 comprises circuit 38. Circuit 38 comprises error checking circuits; two such, circuits are shown in FIG. 3, namely PC-B and PC-C 40 and 42. These circuits check the parity of the bytes on lines 6-1 and 6-2, but any other type of error checking may be performed without departing from the scope of this invention.

Circuit 40 provides an ERROR B signal on line 44 and circuit 42 provides an ERROR C signal on line 46. ERROR B and ERROR C signals are not synchronous with the DMCLK signal so that they cannot be sent in a synchronous way on error lines 24-2.

Lines 44 and 46 are provided to error detection and reporting circuit 48, which provides ERROR B and ERROR C in a pseudo-synchronous way on pseudo synchro error lines 50 under control of pseudo synchro circuit 52. Circuits 48 and 52 are responsive to the tag and clock signals on control lines 8-1 to 22-1 of bus 1, as is schematically represented in FIG. 3.

Lines 24-2, which carry ERROR A redriven signals from synchronous lines 24-1, and pseudo-synchronous error lines 50 are provided to error correlation circuit 54 in adapter 4 together with the ERROR D signal on line 56 from error check circuit PC-D 58 which checks the parity of the bytes received from data lines 6-2. Other error checking circuits may be provided in adapter 4 as the case may be to increase the error detection capability.

PG circuit 59 generates the parity bit on data lines 6-2.

The error correlation circuit 54 generates an indication of the failing part on its output liens 60 as a function of ERROR A, ERROR B, ERROR C and ERROR D.

In the preferred embodiment of the present invention, the failure indication results from the following table:

| Error signal received by adapter | | | Error detected by adapter | Suspected part(s) | |
|---|---|---|---|---|---|
| ERROR A | ERROR B | ERROR C | ERROR D | | |
| 0 | X | 1 | X | 30 | Inbound |
| X | 1 | 0 | X | 30 | Inbound |
| 1 | 0 | 0 | X | 2 or 1-1 | Inbound |
| 1 | 1 | 1 | X | 1-2 or 4 | Inbound |
| X | 1 | X | 0 | 30 | Outbound |

| Error signal received by adapter | | | Error detected by adapter | Suspected part(s) | |
| --- | --- | --- | --- | --- | --- |
| ERROR A | ERROR B | ERROR C | ERROR D | | |
| X | 0 | 1 | X | 30 | Outbound |
| X | 0 | 0 | 1 | 1-2 or 4 | Outbound |
| X | 1 | 1 | 1 | 2 or 1-1 | Outbound |

In the table, X means "do not care", 0 means "no error", 1 means "error".

"Inbound" means write operation or parameter phase of a read operation, when the transfer occurs from adapter to DMA logic device.

"Outbound" means data phase of a read operation, when the transfer occurs from the DMA logic device to the adapter.

A logic circuit implementing the function of error correlation circuit 54 may be easily built from the above table.

Error bus 50 is a pseudo-synchronous bus as error patterns on this bus are not exactly synchronous with the companion clock DMCLK, but are stable at least:
enough time before the sampling time at the adapter and enough time for this sampling to be valid This is represented in FIG. 4 which shows schematically the principle of a true synchronous transmission (FIG. 4-A) and the principle of a pseudo-synchronous transmission (FIG. 4-B).

Figure 5:
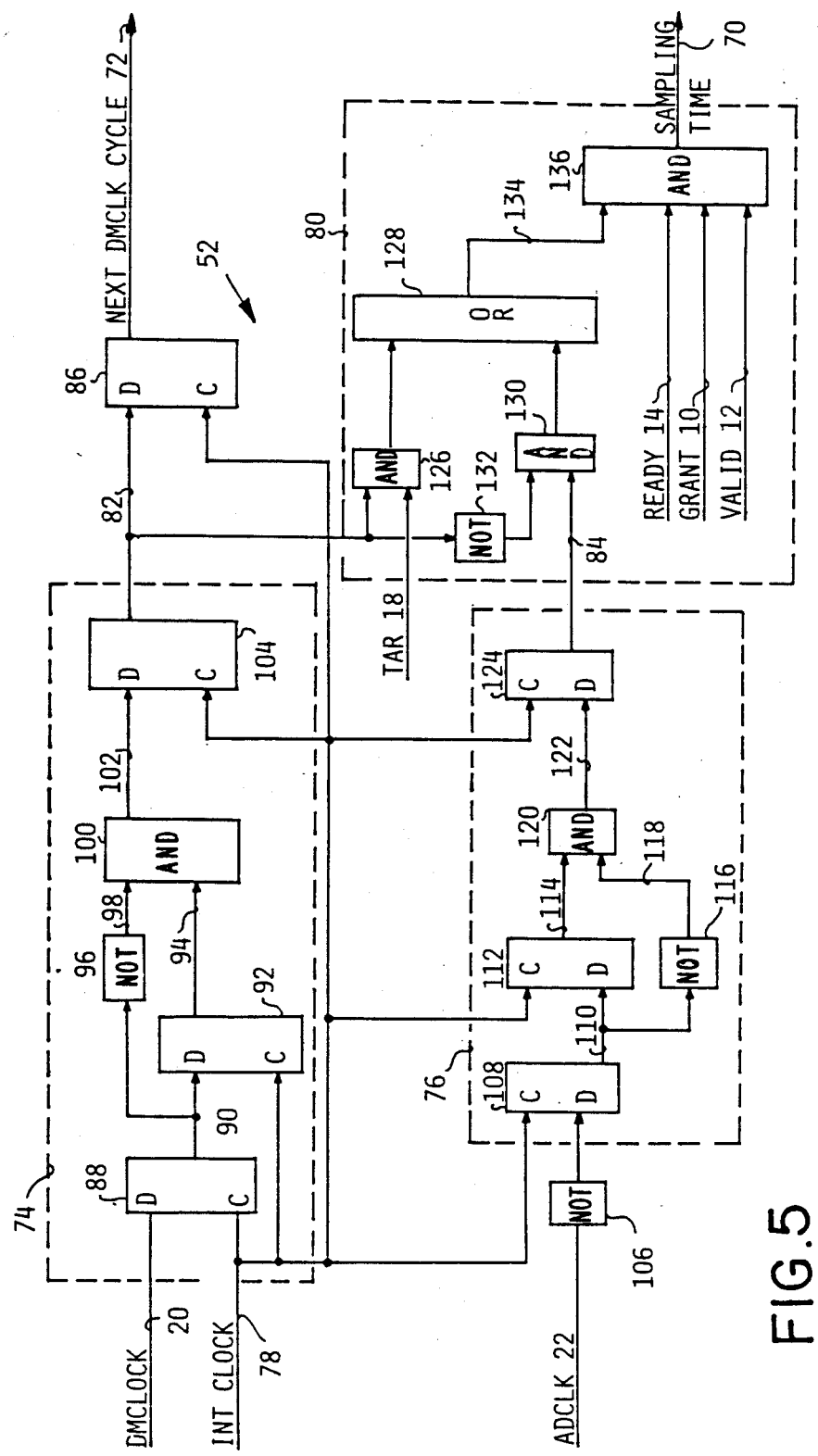
FIG. 5 shows the pseudo-synchronous timing circuit 52 of FIG. 3.

FIG. 5 shows the pseudo-synchronous timing circuit 52. Circuit 52 generates a SAMPLING TIME signal on line 70 which is active in the middle of the DMCLK clock cycle for an outbound transfer and active in the middle of the ADCLK clock cycle for an inbound transfer and a NEXT DMCLK cycle signal on line 72 which is active before the beginning of the next DMCLK clock cycle. These signals are generated from the DMCLK clock signal on line 20, from the ADCLK clock signal on line 22, from an internal clock signal on line 78 which has a frequency higher than the DMCLK and ADCLK clock signals, and from the signals on the control lines 10, 12, 14, 18. In a preferred embodiment of the present invention, the period of the internal clock signal is 40 nanoseconds when the period of the DMCLK and ADCLK clock signals is 150 nanoseconds.

Figure 6:
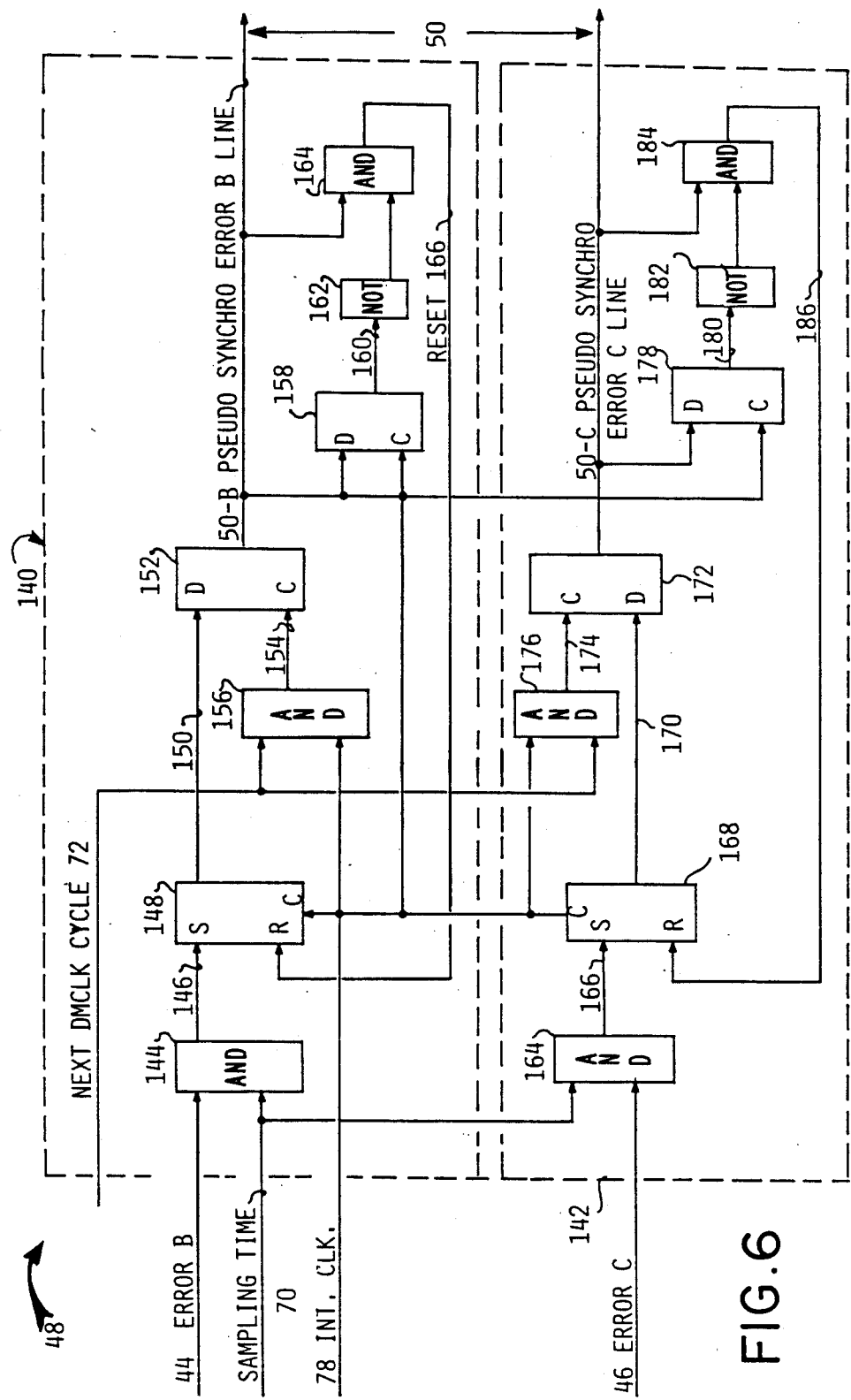
FIG. 6 shows the error detection and reporting circuit 48 of FIG. 3.

Lines 70 and 72 are provided to error detection and reporting circuit 48 in FIG. 6 together with the internal clock signal, to send the error signals on lines 50.

FIG. 5 shows the pseudo synchronous timing circuit 52. It comprises two identical circuits 74 and 76, both being responsive to the internal clock signal on line 78 and one being responsive to the DMCLK clock signal on line 20 and the other being responsive to the ADCLK clock signal on line 22. Gating circuit 80 is connected to the outputs 82 and 84 of circuits 74 and 76 and is responsive to the TAR (turn around) signal on line 18 and to the READY, GRANT and VALID signals to provide the SAMPLING TIME pulses on line 70 either from the output 82 of circuit 74 or from the output 84 of circuit 76 depending upon the direction of transfer which is indicated by the status of the TAR (turn around) signal: TAR=1 means outbound transfer and TAR=0 means inbound transfer in the specific embodiment of the present invention. Latch 86 generates the NEXT DMCLK CYCLE signal on line 72 from the output signal on line 82 from circuit 74.

Circuit 74 comprises D-latch 88, the data input of which is connected to DMCLK clock line 20 and the clock input of which is connected to internal clock line 78. Thus, it provides on its output line 90, the pulse stream A shown in FIG. 7.

Line 90 is provided to the D-input of D-latch 92, the clock input of which is connected to INT. CLOCK line 78, thus it provides the pulse stream B (shown in FIG. 7) on its output line 94. Line 90 is also provided to inverter 96, the output line 98 of which is provided to AND gate 100 together with line 94. Thus, AND gate 94 provides the pulse stream C (shown in FIG. 7) on its output line 102.

Line 102 is connected to the D-input of D-latch 104, the clock input of which is connected to line 78. Thus, D-latch 104 provides on line 82 a pulse stream ST-0 (SAMPLING TIME OUTBOUND) which is provided on line 70 by gating circuit 80, for an outbound transfer. Line 82 is connected to the D-input of D-latch 86, the clock input of which is connected to line 78, so that latch 86 generates the NEXT DMCLK CYCLE signal on line 72, whatever the direction of transfer is.

Circuit 76 operates in the same way as circuit 74, and generates a ST-I (SAMPLING TIME INBOUND) pulse stream on line 84 from the adapter clock signal on line 22 which is inverted by circuit 106. ST-I pulse stream on line 84 is provided by gating circuit 80 as the SAMPLING TIME signal on line 70 for an inbound transfer.

Figure 8:
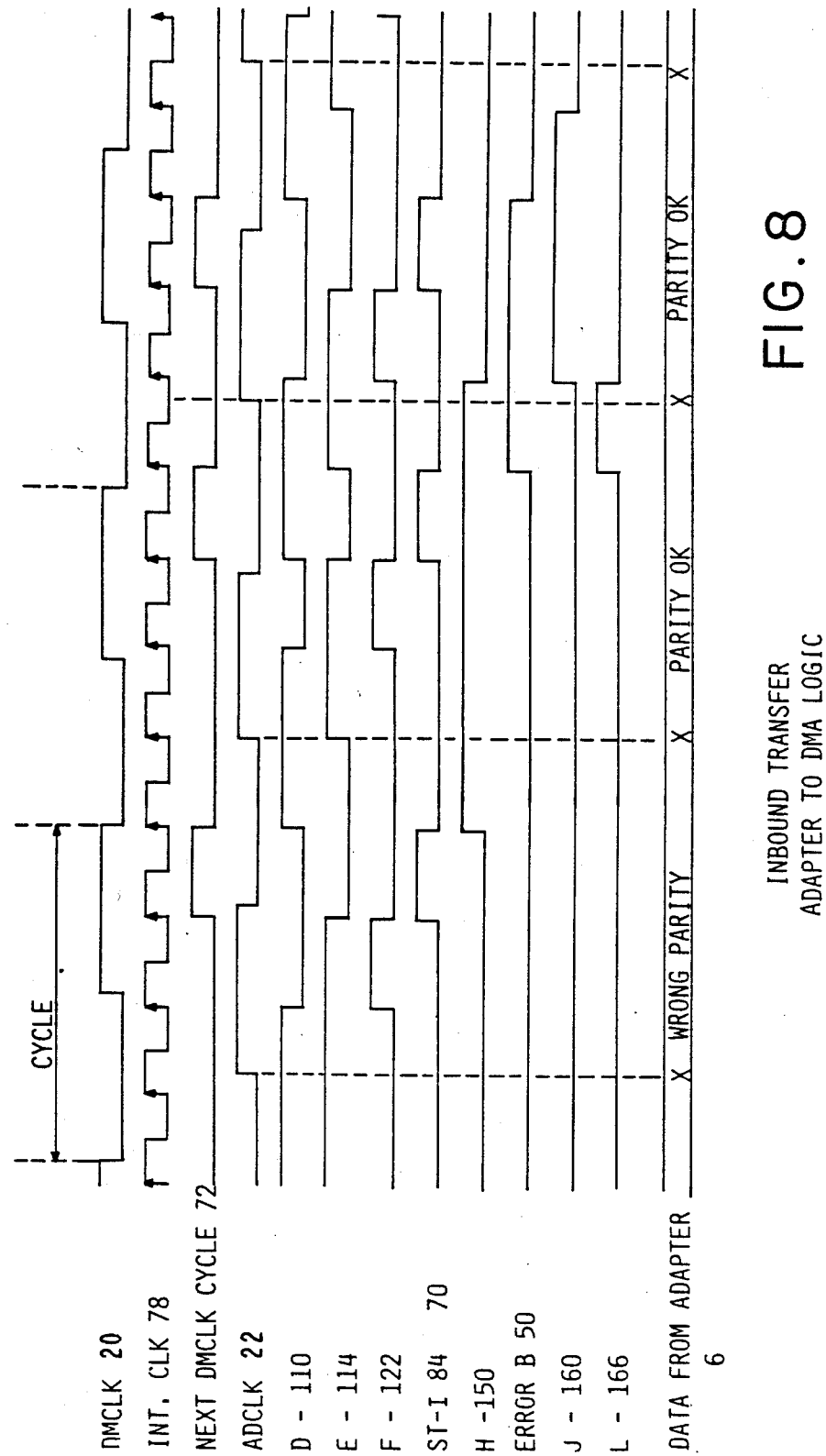
FIG. 8 shows the timing diagram of an outbound pseudo-synchronous transfer (from adapter to DMA logic device).

The output line of inverter 106 is provided to the D-input of latch 108, the clock input of which is connected to line 78. Latch 108 provides signal D on its output line 110, as shown in FIG. 8. Line 110 is provided to the D-input of latch 112, the clock input of which is connected to line 78. Thus, latch 112 provides signal E on its output line 114, as shown in FIG. 8. Signal 110 is also provided to inverter 116, the output line 118 of which is provided to AND gate 120 together with line 114, which provides signal F on its output line 122. Line 122 is provided to the D-input of latch 124, the clock input of which is connected to line 78. Thus, latch 124 provides the ST-1 signal on line 84.

Gating circuit 80 comprises AND gate 126 which is conditioned by TAR signal on line 18 to gate ST-0 signal from line 82 to one input of OR gate 128, (outbound transfer), and AND gate 130 which is conditioned by the inverse of TAR signal which is provided by inverter 132, to gate ST-I signal from line 84 to the other input of OR gate 128. The output line 134 of OR gate 128 is provided to one input of AND gate 136 which is conditioned when a transfer takes place, i.e. when lines 10, 12 and 14 are active.

Error reporting and detection circuit 48 is shown in FIG. 6. It comprises a logic circuit such as 140 for each error line such as 44 and 46 as shown in FIG. 3. Only two error lines and two circuits 140 and 142 are shown in FIG. 6 and only circuit 140 will be described in detail.

Error line 44 and SAMPLING TIME line 70 are provided to AND gate 144. The output line 146 of AND gate 144 is provided to the set input of latch 148, the clock input of which is connected to internal clock line 78. Thus, latch 148 provides the signal G (FIG. 7) or H (FIG. 8) depending on the direction of transfer, on line 150.

Line 150 is provided to the D-input of latch 152, the clock input of which is connected to output line 154 of AND gate 156. The input lines of AND gate 156 are NEXT DMCLK CYCLE line 72 and INT CLK line 78. The output signal of D"latch 152 is the pseudo-synchronous error B signal which is sent on one line 50-B which is part of bus 50.

Figure 7:
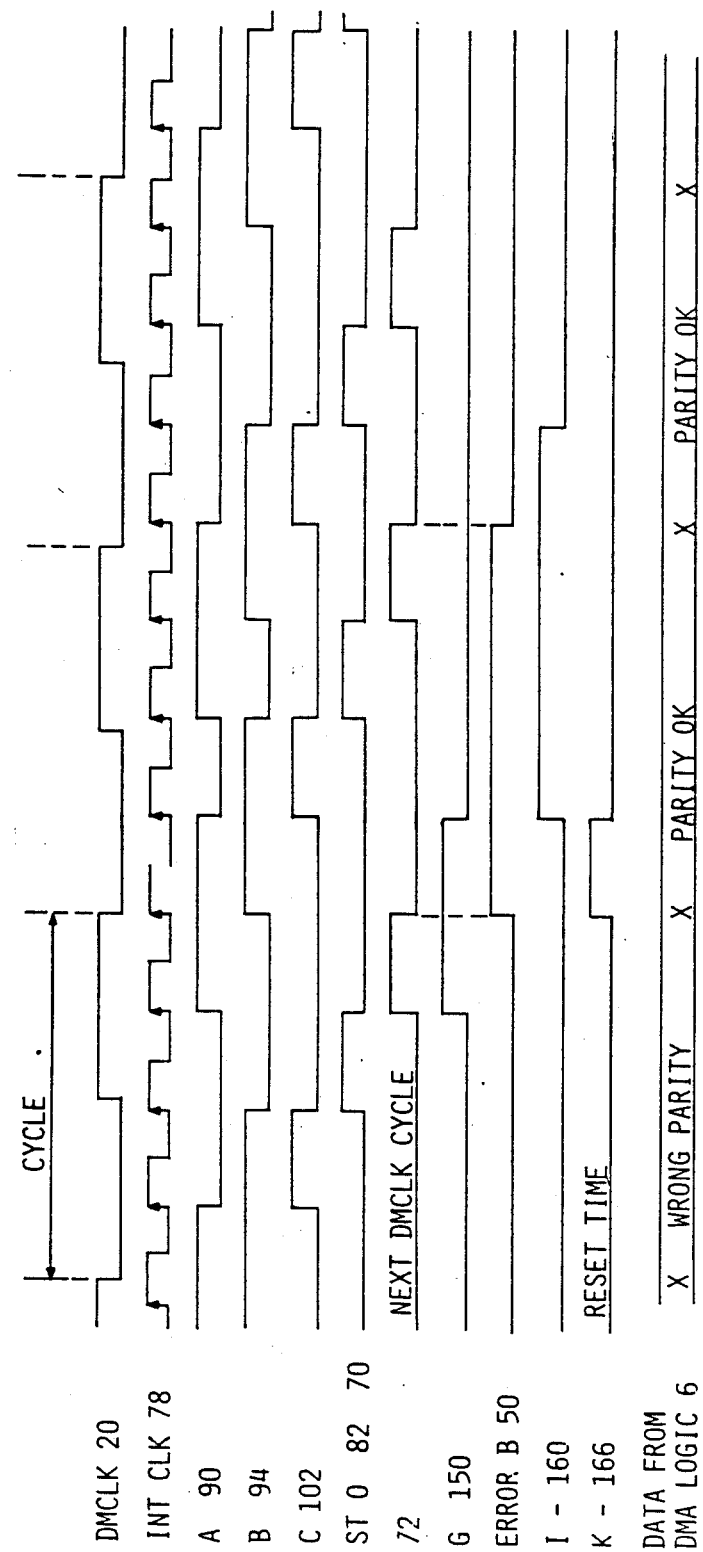
FIG. 7 shows the timing diagram of an outbound pseudo-synchronous transfer (from DMA logic device to adapter).

The output line of D-latch 152 is provided to the D-input of D-latch 158, the clock input of which is connected to line 78, the output signal of latch 158 on line 160 is shown as I in FIG. 7 and J in FIG. 8. Line 160 is provided to inverter 162, the output line of which is provided to AND gate 164 together with line 50-B. Thus, AND gate 164 provides the reset signals K and L shown in FIGS. 8 and 9 on line 166 to reset latch 148 at the appropriate times, which depend upon the transfer direction.

Circuit 142 comprises the same elements as circuits 140, they are referenced by the same reference number plus 20, for example latch 164 has the same function as latch 144.

Figure 9:
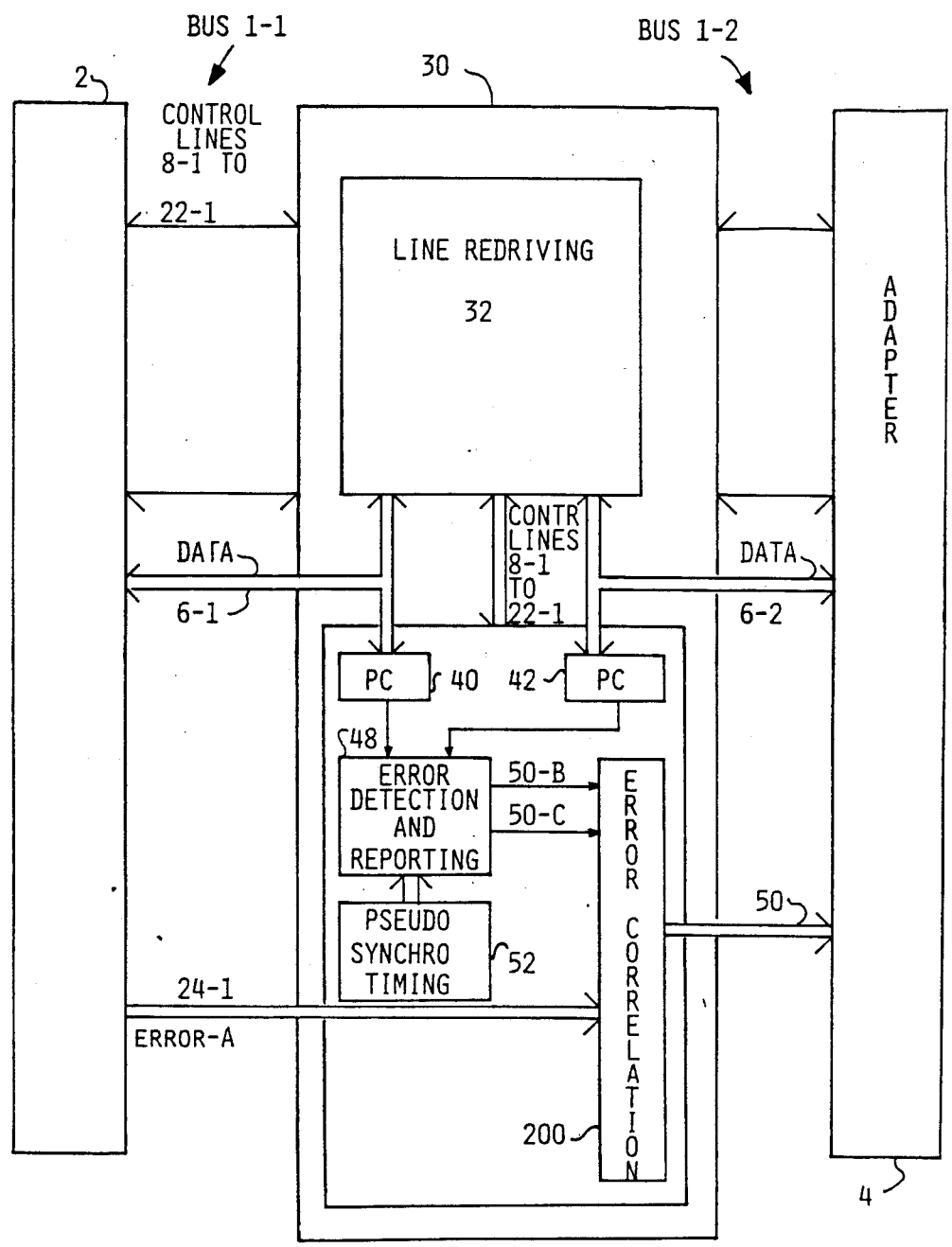
FIG. 9 shows a second implementation of the present invention.

According to another embodiment of the present invention, shown in FIG. 9, error correlation circuit 200 may be implemented in circuit 30, instead of being implemented in adapter 4. In that case, it receives lines 50-B and 50-C from circuit 48 and synchronous error A lines 24-1, and provides an error configuration on bus 50 to adapter 4.

We claim:

1. In a passive device (30) inserted on a synchronous bus (1) linking a first and a second device (2 and 4), said bus comprising data lines (6) onto which data are transferred from the first to the second drive, the transfer of data being timed by a first clock signal carried by a first clock line (20) of the bus, to detect and report errors in a pseudo-synchronous way to the second device on at least one pseudo-synchronous error line (50) of the bus, an error detection apparatus characterized in that it comprises error detecting means (40,42) which are responsive to the data transmitting in the passive device to detect whether the data carried on the data lines are correct or not and generate at least one error signal in case of detected errors, timing means (52) which are responsive to the first clock signal to generate a sampling signal (70) comprising pulses active in the middle of the first clock signal cycles and an error report control signal (72) comprising pulses which are active for a fraction of the first clock signal period at the end of each first clock signal cycle, and error reporting means (48) which are responsive to the sampling signal and to the error report control signal to activate the pseudo-synchronous error line(s) by causing a pulse of the sampling signal to sample the error signal(s) and activate the pseudo-synchronous error line(s) during the time period defined by the two pulses of the error report control signal following said sampling pulse if the sampled error signal(s) is/are indicative of detected errors.

2. An error detection apparatus according to claim 1, wherein the data lines are bidirectional so that data are transferred from the first to the second device under control of the first clock signal or from the second to the first device under control of a second clock signal, said first and second clock signals having the same frequency and the direction of transfers on the data lines being controlled by a transfer control signal generated by the first device on a transfer control line (18), the mechanism being characterized in that:

the timing means are responsive to the transfer control signal and to the first and second clock signals to activate the pulses of the sampling signal in the middle of the first or of the second clock signal depending upon the direction of transfer.

3. An error detection apparatus according to claim 1 or 2 characterized in that the error detecting means comprise:

a first error detecting circuit (40) detecting whether the data at the input of the passive device are correct or not, which provides a first error signal reported on a first pseudo-synchronous error line (50-B), a second error detecting circuit (42) detecting whether the data at the output of the passive device are correct or not, which provides a second error signal reported on a second pseudo-synchronous error line (50-C), a third error detecting circuit (34) located in the first device and detecting whether the data sent from the first device are corrected or not and generating therefrom a signal which is indicative of an error in the first device, a fourth error detecting circuit (58) located in the second device detecting whether the data received by said device are correct or not and generating therefrom a signal which is indicative of an error in the second device, and means responsive to the error signals reported on the first and second pseudo-synchronous error lines and to the signal provided by the third and fourth error detecting circuits, to provide error signal indicative of the failing devices.

4. An error detecting apparatus according to claim 1 or 2 characterized in that the error detecting means comprise:

a first error detecting circuit (40) detecting whether the data at the input of the passive device are correct or not, which provides a first error signal, a second error detecting circuit (42) detecting whether the data at the output of the passive device are correct or not, which provides a second error signal, said first and second error signals being provided to the error reporting means which generates first and second pseudo-synchronous error signals therefrom, a third error detecting circuit (34) located in the first device and detecting whether the data sent from the first device are correct or not and generating therefrom a signal which is indicative of an error in the first device, means (200) located in the passive device and responsive to the first and second synchronous error signals and to the signal provided by the third device to provide error signals indicative of the failing devices, which are reported on the pseudo-synchronous error lines (50) of the bus.

5. An error detection apparatus according to claim 1 or claim 2 characterized in that the timing means comprise:

internal clock means (78) providing an internal clock signal having a frequency higher than the frequency of the first clock signal, first logic means (74) responsive to the internal clock signal and to the first clock signal for generating the sampling signal comprising active pulses in the middle of the first clock signal cycles during an internal clock period, and second logic means (86) responsive to the pulses of the sampling signal and to the internal clock signal to generate the report error control signal during an internal clock signal period at the end of the first clock signal.

6. An error detecting apparatus according to claim 2 characterized in that the timing means comprise:

internal clock means (78) providing an internal clock signal having a frequency higher than the frequency of the first clock signal, first logic means (74) responsive to the internal clock signal and to the first clock signal for generating a first sampling signal comprising active pulses in the middle of the first clock signal cycles during an internal clock period, which is selected as the sampling signal used when the transfer is from the first to the second device under control of the transfer control signal, second logic means (86) responsive to the pulses of the first sampling signal and to the internal clock signal to generate the report error control signal during an internal clock signal period at the end of the first clock signal cycles, and third logic means (76) responsive to the internal clock signal and to the second clock signal for generating a second sampling signal comprising active pulses in the middle of the second clock signal during an internal clock period, which is selected as the sampling signal used when the transfer is from the second to the first device under control of the transfer control signal.

7. An error detection apparatus according to claim 6, characterized in that the error reporting means comprise:

gating means (144) responsive to the error signal provided by the error detecting means and to the pulses of the sampling signal to gate on its output line the error signal as its output signal during the duration of one pulse of the sampling signal, means (148,156,152) responsive to the internal clock signal and to the output signal from the gating means to activate the pseudo-synchronous error line between the two pulses of the error report control signal when said output signal is active.

* * * * *